United States Patent [19]

Tatara

[11] Patent Number: 4,851,997
[45] Date of Patent: Jul. 25, 1989

[54] LOCAL AREA NETWORK CONTROL APPARATUS

[75] Inventor: Hiroshi Tatara, Kamakura, Japan

[73] Assignee: Mitsubishi Denki Kabushiki Kaisha, Japan

[21] Appl. No.: 17,697

[22] Filed: Feb. 24, 1987

[30] Foreign Application Priority Data

Feb. 26, 1986 [JP] Japan .................................. 61-39004

[51] Int. Cl.⁴ ...................... G06F 15/16; G06F 13/42
[52] U.S. Cl. ............................. 364/284.4; 364/242.95
[58] Field of Search ............................. 364/200, 900

[56] References Cited

U.S. PATENT DOCUMENTS

| | | | |
|---|---|---|---|
| 4,063,220 | 12/1977 | Metcalfe et al. | 340/147 L P |
| 4,204,253 | 5/1980 | van den Hanenberg et al. | 364/200 |
| 4,449,181 | 5/1984 | Young et al. | 364/200 |
| 4,453,213 | 6/1984 | Romagosa | 364/200 |
| 4,493,021 | 1/1985 | Agrawal et al. | 364/200 |
| 4,513,373 | 4/1985 | Sheets | 364/200 |
| 4,604,686 | 8/1986 | Reiter et al. | 364/200 |
| 4,661,902 | 4/1987 | Hochsprung et al. | 364/200 |
| 4,672,570 | 6/1987 | Benken | 364/900 |
| 4,714,995 | 12/1987 | Materna et al. | 364/200 |
| 4,730,250 | 3/1988 | Girard et al. | 364/200 |

FOREIGN PATENT DOCUMENTS

51-114804 10/1976 Japan .

OTHER PUBLICATIONS

Thomas C. Bartee, editor, "Data Communications, Networks & Systems", 1985, 264–271 & 280–283.
"Ethernet LAN of Bridge Communication Inc.", Computer & Network Lan, 1984.

Primary Examiner—Felix D. Gruber
Attorney, Agent, or Firm—Leydig, Voit & Mayer

[57] ABSTRACT

A local area network control apparatus is interposed between a host computer whose main storage stores an appropriate number of user programs and a plurality of interactive terminals which have protocols of any desired level. The apparatus comprises a program module which has a predetermined bypass function, a program module which has a function of executing a specified protocol, and a control table in which names of the user programs to be handled, designations of the interacting terminals thereof and protocol execution ranges thereof are set as parameters for required data transmission/reception. The protocols are selectively executed depending upon the contents of the control table in which the names of the user programs to be handled, the designations of the interacting terminals thereof and the protocol execution ranges thereof are set as the parameters for the required data transmission/reception.

7 Claims, 6 Drawing Sheets

| PROGRAM NAME | DESIGNATION OF INTERACTING PARTY | PROTOCOL EXECUTION RANGE | | |
|---|---|---|---|---|
| | | MAC | LLC | L3 |
| 1 | #1 INTERACTIVE TERMINAL | ○ | × | × |
| 2 | #2 INTERACTIVE TERMINAL | ○ | ○ | × |
| 3 | #3 INTERACTIVE TERMINAL | ○ | ○ | ○ |
| | | | | |

106

LOCAL AREA NETWORK CONTROL APPARATUS

BACKGROUND OF THE INVENTION

This invention relates to a local area network control apparatus. More particularly, it relates to a local area network control apparatus for realizing high-speed data transmission and reception with a local area network among computer terminals which are installed in appropriate places within a building or a factory.

FIG. 1 is a block diagram of a data transmission and reception system which includes a prior-art local area network control apparatus of the type specified above. Referring to FIG. 1, numeral 100 designates the prior-art local area network control apparatus having a channel interface unit 101, an internal memory 102, a Media Access Control (MAC) processing unit 108, a physical signal processing unit 109 and an internal processor 110, which are all interconnected by an internal bus 111. The internal memory 102 is furnished with an Higher Layer Interface (HLIF) module 103 and a transmission/reception buffer 107. In addition, numeral 200 designates a host computer having a main storage 201, a processor 203 and an input/output channel 205, which are all interconnected by a system bus 204. The main storage 201 stores a suitable number of appropriate kinds of user programs; Program 1 (202a), Program 2 (202b) and Program 3 (202c). The input/output channel 205 is connected with the channel interface unit 101 of the local area network control apparatus 100 by an input/output channel cable 300. Symbols 500a, 500b and 500c denote interactive computer terminals which are the opposite parties of data transmission and reception, and which are respectively labeled interactive terminals #1, #2 and #3. These terminals are connected to the local area network control apparatus 100 through a transmission medium 400. In addition, FIG. 2 is a flow chart for explaining the operation of the prior-art example.

Next, the operation will be explained. It is assumed that the local area network control apparatus 100 commences operating upon the receipt of a predetermined input/output control command given thereto through the input/output channel 205 and input/output channel cable 300 from any of Program 1 (202a)–Program 3 (202c), the user programs within the main storage 201 of the host computer 200. First, the command from the corresponding user program is analyzed by the HLIF module 103 within the internal memory 102 (S700), and it is determined whether data is to be transmitted or received (S701). Subsequently, if transmission has been determined, the transmission data from the side of the host computer 200 is accepted by the transmission/reception buffer 107 within the internal memory 102, and a MAC protocol is executed (a header is generated) by the MAC processing unit 108 (S702), whereupon data is transferred from the physical signal processing unit 109 to the transmission medium 400 (S703). On the other hand, if reception has been determined, the reception of data from any of the #1–#3 interactive terminals 500a–500c is awaited (S704). When the required data has appeared on the transmission medium 400, a MAC protocol is executed (a header is removed) by the MAC processing unit 108 through the physical signal processing unit 109 (S705), and the data containing the protocol is derived.

Upon carrying out the transmittal and receipt of the data between the computer terminals in this manner, communication protocols are not always limited to one specified type, but there can be a large number of modifications, depending upon the sort of computer terminals used and the level of standardization of the protocols. Among these, protocols of and below a data link layer, MAC protocols (for example, IEEE 8023 Carrier-Sense Multiple Access/Collision Detection CSMA/CD and Logical Link Control (LLC) protocols (for example, IEEE 8022) by IEEE 802 Committee have been considerably standardized. In addition, as to protocols of a network layer, the connection type and the connectionless type are being established by the International Standard Organization (ISO).

It is therefore the present situation that the protocol standardization differs with the sort of computer terminals used.

The prior-art local area network control apparatus is constructed and operated as described above, and the required protocols for the computer terminals constituting a local area network are not completely standardized. This has led to the problem that unstandardized protocols must be processed by software provided on the computer terminal side which increases overhead.

SUMMARY OF THE INVENTION

This invention has been made in order to solve the problems mentioned above, and has for its object to provide a local area network control apparatus having slight overhead and capable of flexible processing in which the function of executing protocols up to the so-called network layer is provided thereby to enhance the processing performance of the control apparatus, and in which when a protocol at a predetermined level between the control apparatus and an interactive data transmission/reception terminal differs, it is bypassed and can be processed by software corresponding thereto.

DESCRIPTION OF THE PREFERRED EMBODIMENT

Figure 1:
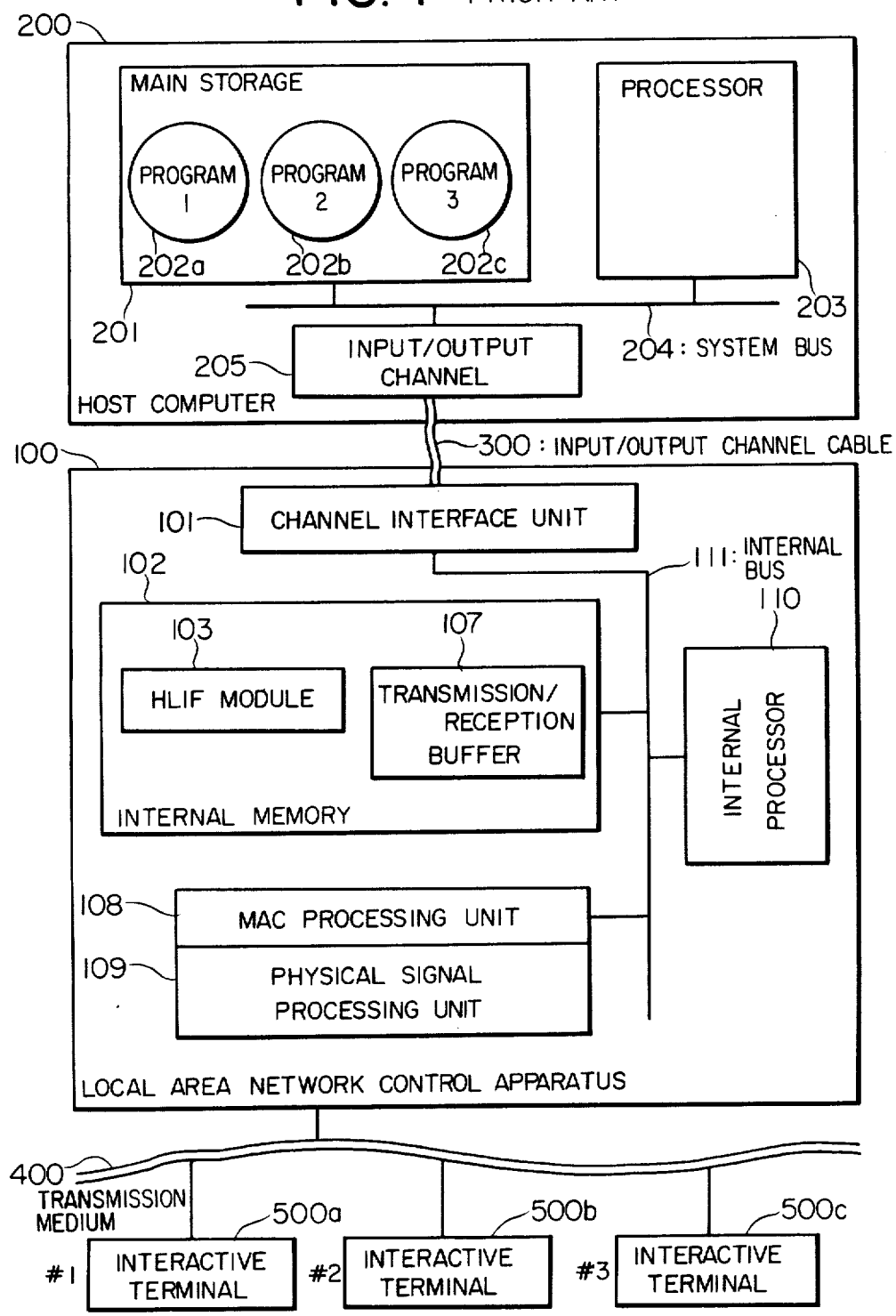
FIG. 1 is a block diagram of a data transmission/reception system which includes a prior-art local area network control apparatus.
Figure 2:
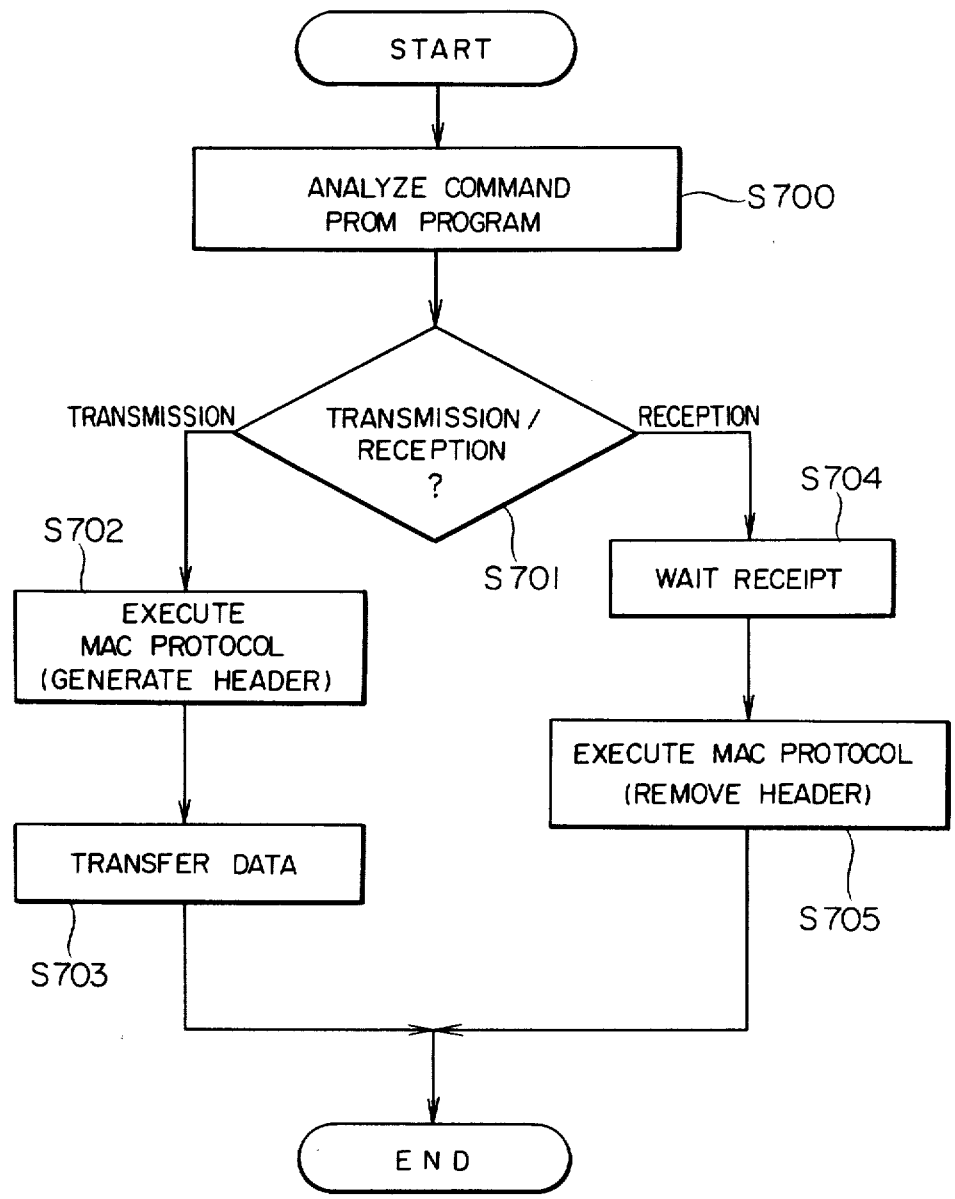
FIG. 2 is a flow chart for explaining the operation of the prior-art example.
Figure 3:
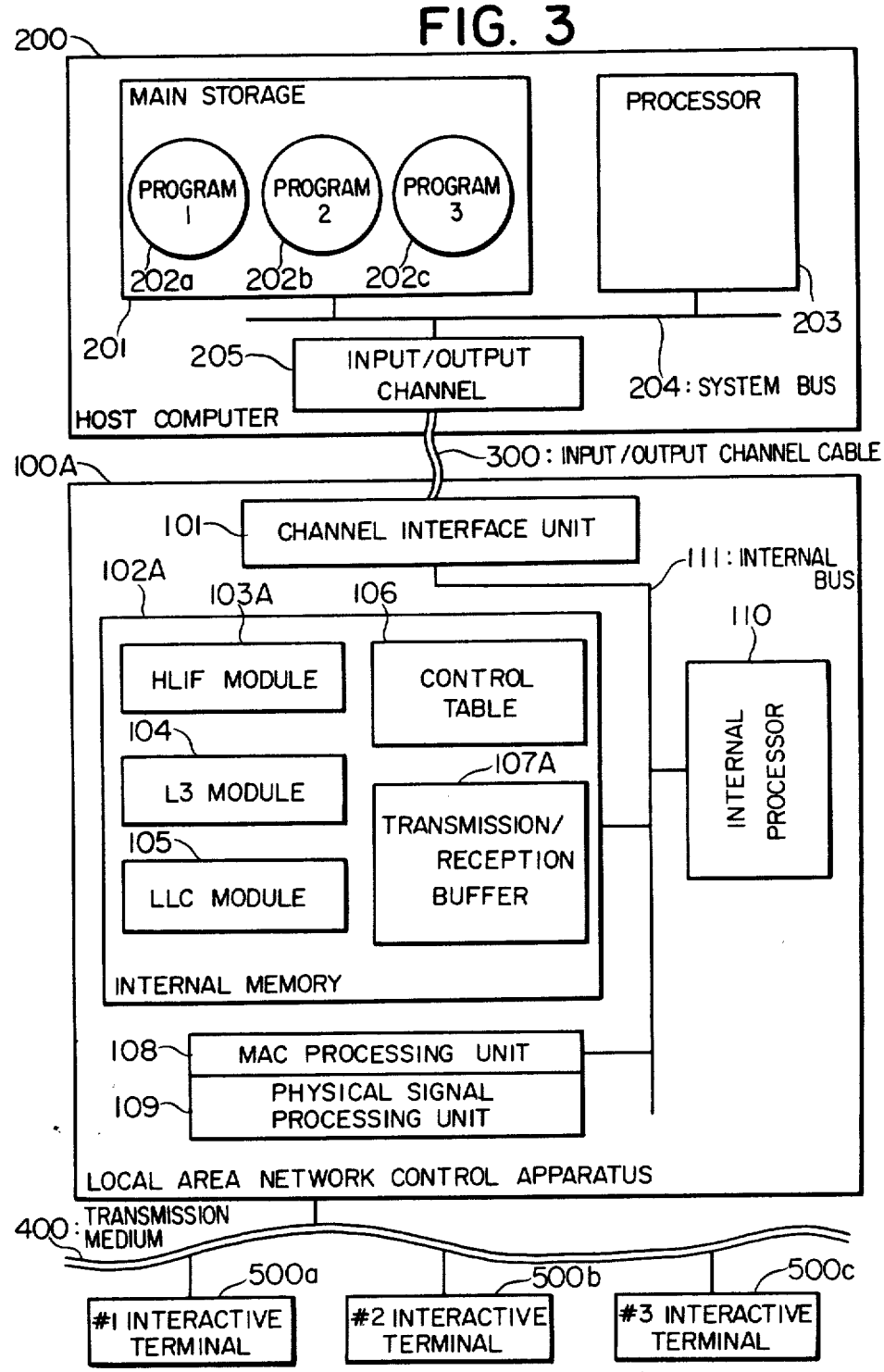
FIG. 3 is a block diagram of a data transmission/reception system which includes a local area network control apparatus embodying this invention.

FIG. 3 is a block diagram of a data transmission/reception system which includes a local area network control apparatus embodying this invention. Referring to FIG. 3, the internal memory 102A of a local area network control apparatus 100A includes an HLIF module 103A which has a bypass function based on content indicated in a protocol execution range, an L3 module 104 as a program module which implements the function of executing the protocols of a network layer, an LLC module 105 as a program module which implements the function of executing the protocols of a logic link control based on IEEE ratings, a control table 106 which serves to set the names of various user programs stored in the main storage 201 of a host computer 200, the designations of the interactive data transmission/reception parties and the protocol execution ranges, and a transmission/reception buffer 107A. In FIG. 3, the same symbols as in FIG. 1 indicate identical or corresponding portions.

Figures 4, 5:
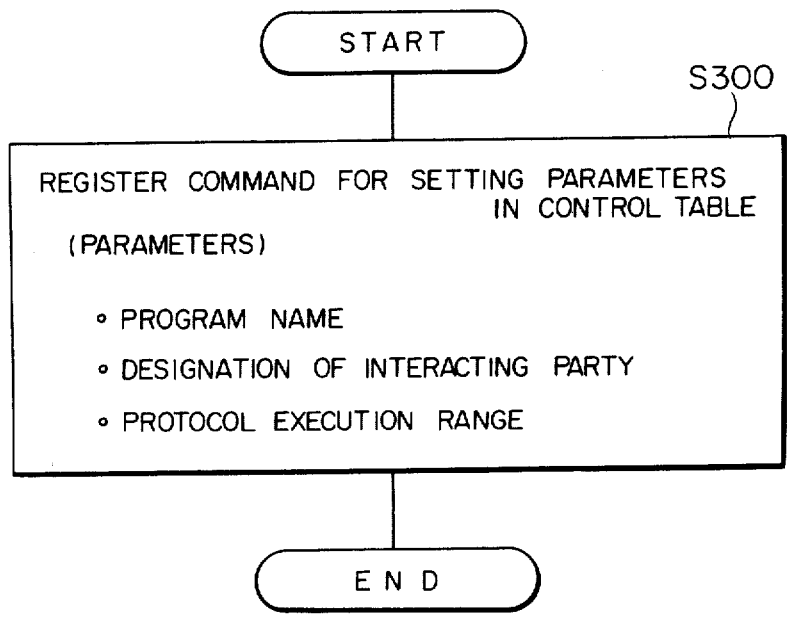
FIG. 4 is a format diagram of a control table in the embodiment.
FIG. 5 is a flow chart for explaining the operation relevant to the control table.

FIG. 4 is a format diagram of the control table 106. In this table, the program names of the various user programs stored in the main storage 201 of the host computer 200 in FIG. 3, the designations of the interactive parties corresponding thereto, and the protocol execution ranges are set as required parameters. In FIG. 4, o marks indicate that the corresponding protocols can be implemented, and x marks indicate that the corresponding protocols can not be implemented.

Figure 6:
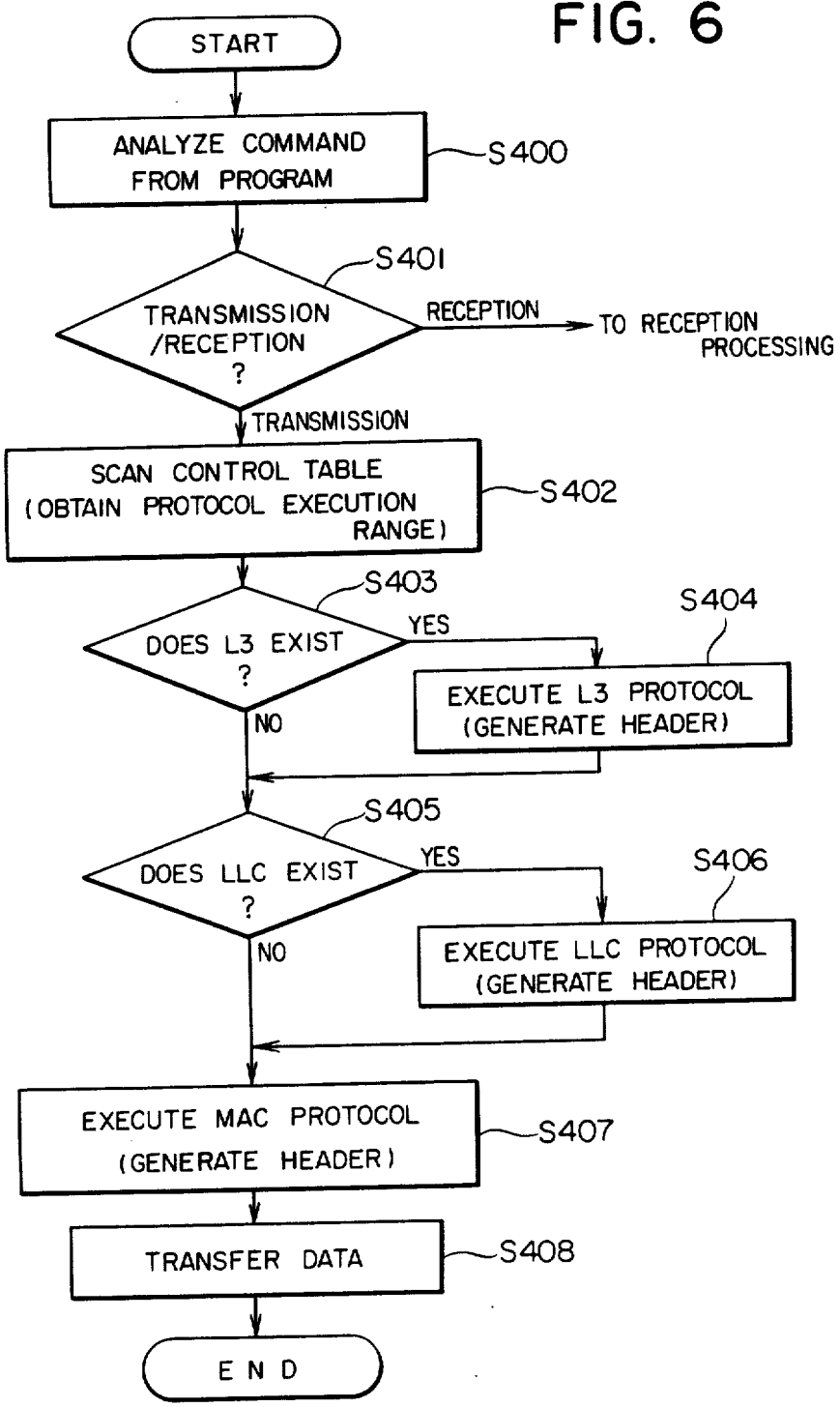
FIG. 6 is a flow chart for explaining the processing steps of data transmission in the embodiment.
Figure 7:
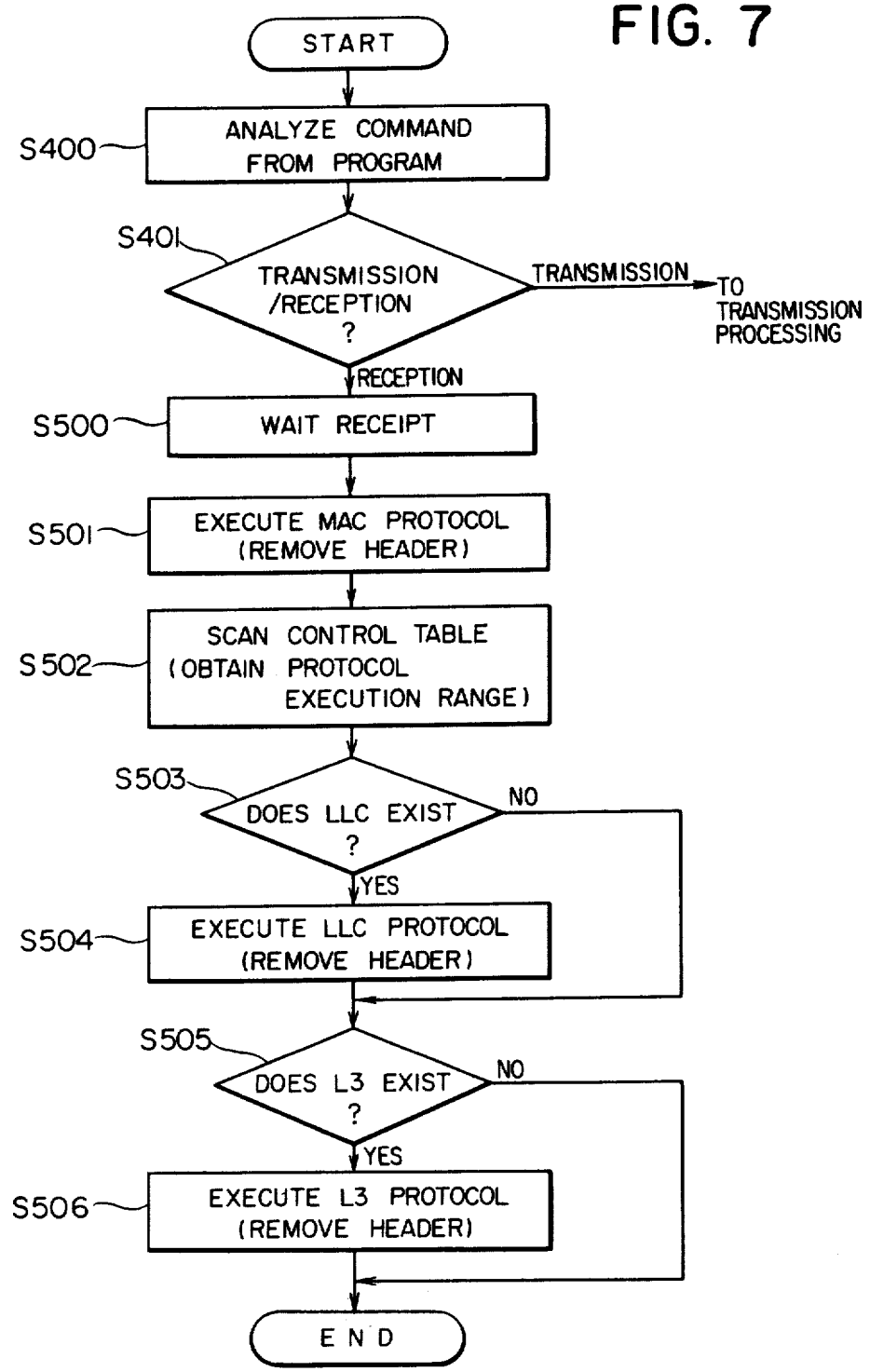
FIG. 7 is a flow chart for explaining the processing steps of data reception in the embodiment.

FIG. 5 is a flow chart for explaining the execution of a register command for setting the required parameters in the control table 106, FIG. 6 is a flow chart for explaining the processing steps of data transmission in the embodiment, and FIG. 7 is a flow chart for explaining the processing steps of data reception in the embodiment.

Next, the operation of the embodiment will be described. As regards the various user programs within the main storage 201 of the host computer 200 in FIG. 3, it is now assumed that only the MAC protocol is standardized for the program 1 (202a), that the LLC protocol is standardized for the program 2 (202b) as well as the MAC protocol, and that all three types of protocols including the L3 protocol are standardized for the program 3 (202c).

First, the required data transmission/reception operation is carried out preceded by the following preparatory operation: At step S300 shown in FIG. 5, each of the programs 1 (202a) thru 3 (202c) issues a register command for setting the predetermined parameters in the control table 106 within the internal memory 102A of the local area network control apparatus 100A. Such predetermined parameters are the name of the user program which issued the register command, the designation of the interacting party, and the protocol execution range. After the predetermined parameters have been set in the control table 106 by the register command, the transmission/reception of data required for each of the programs 1 (202a) thru 3 (202c) is executed.

It is now assumed that the local area network control apparatus 100A has started operating upon a predetermined input/output control command being issued thereto from any of the programs 1 (202a) thru 3 (202c) which are the user programs within the main storage 201 of the host computer 200.

Here, the operation of data transmission will be elucidated with reference to FIG. 6. The command from the corresponding user program is analyzed by the HLIF module 103A within the internal memory 102A (S400) and it is subsequently determined whether data is to be transmitted or received (S401). When transmission has been determined, the transmission data from the side of the host computer 200 is accepted by the transmission/reception buffer 107A within the internal memory 102A, and the control table 106 is scanned by the HLIF module 103A (S402) to obtain the execution range of protocols based on the name of the pertinent user program and the designation of the interacting party. As to the protocol execution range thus obtained, it is first determined whether or not an L3 protocol exists (S403). If the L3 protocol "exists," it is executed (a header is generated) by the L3 module 104 (S404), and if it "does not exist," the control flow skips step S404 and shifts to the succeeding determination step S405. This step S405 determines whether or not an LLC protocol exists. If the LLC protocol "exists," it is executed (a header is generated) by the LLC module 105 (S406), and if it "does not exist," the control flow skips the step S406 and shifts to the next step S407. At this step S407, a MAC protocol is executed (a header is generated) by the MAC processing unit 108. At last, data is transferred from the physical signal processing unit 109 to the transmission medium 400 (S408).

Next, the operation of data reception will be elucidated with reference to FIG. 7. The analysis of the command from the corresponding user program (S400) and the determination of either the transmission or the reception (S401) is carried out as in the foregoing case of FIG. 6. Here, when reception from the side of the host computer 200 has been determined, the reception of data from any of the #1–#3 interactive party terminals 500a–500c is waited (S500). When the required data has appeared on the transmission medium 400, a MAC protocol is executed (a header is removed) by the MAC processing unit 108 through the physical signal processing unit 109 (S501). The designation of an interacting party is identified by the execution of the MAC protocol, and the control table 106 is scanned on the basis of the identified designation of the interacting party (S502), to obtain the execution range of the corresponding protocol. Subsequently, it is determined whether or not an LLC protocol exists (S503). If an LLC protocol "exists," it is executed (a header is generated) by the LLC module 105 (S504), and if it "does not exist," the step S504 is skipped. At the next step S505, it is determined whether or not an L3 protocol exists. If the L3 protocol "exists," it is executed (a header is removed) by the L3 module 104 (S506), and if it "does not exist," the step S506 is skipped.

Although, in the above embodiment, the control table 106 has been described as being disposed in the internal memory 102A of the local area network control apparatus 100A, this is not restrictive. The same effects as in the case of the embodiment are attained even by disposing the control table in a proper register which is a separate hardware element or by disposing it in the main storage 201 of the host computer 200.

In the embodiment, the setting of the required parameters into the control table 106 as based on the execution of the register commands is performed as the preparatory operation preceding the start of the execution of the data transmission/reception for the corresponding user programs. However, this is not restrictive, but the required parameters can be set at any desired stage previous to the start of the execution of the data transmission/reception.

As described above, a local area network control apparatus according to this invention is interposed between a host computer whose main storage stores an appropriate number of user programs and a plurality of interactive terminals which have protocols of any desired levels; and comprises at least a program module which has a predetermined bypass function, a program module which has a function of executing a specified protocol, and a control table in which names of the user programs to be handled, designations of the interacting terminals thereof and protocol execution ranges thereof are set as parameters for required data transmission/reception, whereby the protocols are selectively executed depending upon the contents of the control table. The invention therefore achieves the effects that the overhead attributed to the mismatching of protocols decreases, and that flexible processing can be performed.

What is claimed is:

1. A local area network control apparatus interposed between a host computer whose main storage stores an appropriate number of user programs and a plurality of interactive terminals which have protocols of any desired level comprising
a program module which has a predetermined protocol bypass function, a program module which has a function of executing a predetermined protocol, and a control table wherein required data transmission/reception is performed between the host computer and any one of the interactive terminals including the execution of protocols according to suitable parameters in the control table, such as names of the user programs to be handled, designations of the interactive terminals thereof, and protocol execution ranges thereof.

2. A local area network control apparatus according to claim 1 wherein said control table is comprised in an internal memory of said apparatus.

3. A local area network control apparatus according to claim 1 wherein said control table is comprised in said main storage of said host computer.

4. A local area network control apparatus according to claim 1 wherein said control table is comprised in a register separately disposed.

5. A local area network control system interposed between a host computer including main storage which stores user programs and a plurality of terminals which support a plurality of data communications protocols, the system comprising:
a control table containing parameters including terminal designations and ranges of protocol which are supported by the terminals;
a protocol program module which executes a predetermined protocol according to the parameters in the control table; and
a bypass program module which bypasses execution of a predetermined protocol according to the parameters in the control table.

6. A local area network control system according to claim 5 wherein the parameters contained in the control table further include user program names.

7. A local area network control system according to claim 5 wherein protocol for required data transmission/reception between the host computer and a terminal is implemented or bypassed according to the parameters in the control table.

* * * * *